(12) United States Patent
Singhal et al.

(10) Patent No.: US 8,199,759 B2
(45) Date of Patent: Jun. 12, 2012

(54) METHOD AND APPARATUS FOR ENABLING ID BASED STREAMS OVER PCI EXPRESS

(75) Inventors: Abhishek Singhal, Santa Clara, CA (US); David Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 12/474,480

(22) Filed: May 29, 2009

(65) Prior Publication Data

US 2010/0303079 A1 Dec. 2, 2010

(51) Int. Cl.
H04L 12/56 (2006.01)
(52) U.S. Cl. .................................................. 370/394
(58) Field of Classification Search .................. 370/394, 370/392, 389
See application file for complete search history.

(56) References Cited

U.S. PATENT DOCUMENTS

| | | | |
|---|---|---|---|
| 6,691,192 B2* | 2/2004 | Ajanovic et al. | 710/107 |
| 7,443,869 B2* | 10/2008 | Solomon et al. | 370/412 |
| 2003/0145134 A1 | 7/2003 | Wehage et al. | |
| 2003/0163649 A1 | 8/2003 | Kapur et al. | |
| 2004/0024948 A1* | 2/2004 | Winkler et al. | 710/311 |
| 2005/0251612 A1 | 11/2005 | Creta et al. | |
| 2007/0211746 A1 | 9/2007 | Oshikiri et al. | |
| 2008/0005484 A1 | 1/2008 | Joshi | |

FOREIGN PATENT DOCUMENTS

| WO | 2010/138230 A2 | 12/2010 |
|---|---|---|
| WO | 2010/138230 A3 | 1/2011 |

OTHER PUBLICATIONS

International Search Report and Written Opinion received for PCT Application No. PCT/US20101026777, Mailed on Sep. 30, 2010, 9 pages.
International Preliminary Report on Patentability received for PCT Patent Application No. PCT/US2010/026777, mailed on Dec. 8, 2011, 6 pages.

* cited by examiner

*Primary Examiner* — Dang Ton
*Assistant Examiner* — Kevin Lee
(74) *Attorney, Agent, or Firm* — David L. Guglielmi

(57) ABSTRACT

A method and apparatus for enabling ID based streams over Peripheral Component Interconnect Express (PCIe) is herein described. In this regard an apparatus is introduced including a memory ordering logic to order packets to be transmitted over a serial point-to-point interconnect, the memory ordering logic to bypass a stalled first packet with a second packet that arrived after the first packet if the second packet includes an attribute flag set to indicate that the second packet is order independent and if the second packet includes an ID that is different from an ID associated with the first packet. Other embodiments are also described and claimed.

9 Claims, 6 Drawing Sheets

500

| Row Pass Column? | Posted Request | Non-Posted Request | | Completion | |
|---|---|---|---|---|---|
| | Memory Write or Message Request (Col 2) | Read Request (Col 3) | I/O or Configuration Write Request (Col 4) | Read Completion (Col 5) | I/O or Configuration Write Completion (Col 6) |
| Memory Write or Message Request (Row A) | a) No<br>b) Y/N<br>c) Y/N  505 | Yes | Yes | a) Y/N<br>b) Yes | a) Y/N<br>b) Yes |
| Read Request (Row B) | a) No<br>b) No<br>c) Y/N  510 | Y/N | Y/N | Y/N | Y/N |
| I/O or Configuration Write Request (Row C) | No  515 | Y/N | Y/N | Y/N | Y/N |
| Read Completion (Row D) | a) No<br>b) Y/N<br>c) Y/N  520 | Yes | Yes | a) Y/N<br>b) No | Y/N |
| I/O or Configuration Write Completion (Row E) | Y/N  525 | Yes | Yes | Y/N | Y/N |

FIG. 5

METHOD AND APPARATUS FOR ENABLING ID BASED STREAMS OVER PCI EXPRESS

FIELD

This invention relates to the field of interconnects and, in particular, to enabling ID based streams over PCI Express.

BACKGROUND

Computer systems include a number of components and elements. Often the components are coupled via a bus or interconnect. Previously, input/output (I/O) devices were coupled together through a conventional multi-drop parallel bus architecture referred to as Peripheral Component Interconnect (PCI). More recently, a new generation of an I/O bus referred to as PCI-Express (PCIe) has been used to facilitate faster interconnection between devices utilizing a serial physical-layer communication protocol.

A PCIE architecture includes a layered protocol to communicate between device. As an example, a physical layer, link layer, and transaction layer form a PCIE protocol stack. The PCIe link is built around dedicated unidirectional pairs of serial point-to-point connections referred to as a lane. A link between devices includes some number of lanes, such as one, two, sixteen, thirty-two, and so-on. The current PCIE specification, base spec 2.0, is available at http://w.w.w.pcisig.com/specifications/pciexpress/.

Conventional PCIe ordering rules have been created to enable a producer-consumer programming model. Under this model, reads from a particular device are required to push the writes that were generated ahead of it. Such a programming model ensures that the read of a memory location X will always get the most recent data that was written to the memory location.

However, this ordering requirement causes requests from one request stream (a sequence of read or write transactions that have the same requester and the same destination) to interfere with another independent request stream. This interference can cause a severe performance bottleneck. The problem is especially bad if non-posted requests are blocked behind posted requests as read requests are latency sensitive.

BRIEF DESCRIPTION OF THE DRAWINGS

The present invention is illustrated by way of example and not intended to be limited by the figures of the accompanying drawings.

FIG. 5 illustrates an embodiment of an ordering table.

DETAILED DESCRIPTION

In the following description, numerous specific details are set forth such as examples of specific interconnects, specific packets/messages, specific fields and locations within packets/messages, specific location of logic/caches, etc. in order to provide a thorough understanding of the present invention. It will be apparent, however, to one skilled in the art that these specific details need not be employed to practice the present invention. In other instances, well known components or methods, such as cache logic/implementation, peripheral Component Interconnect Express (PCIe) messaging protocols, PCIe fields/packets in transactions, and other PCIe basic implementation have not been described in detail in order to avoid unnecessarily obscuring the present invention.

The method and apparatus described herein are for enabling ID based streams over PCIe. Specifically, bypassing of queued requests in a switch is discussed in reference to a posted request that is stalled (on credits or other events like page-fault). However, the methods and apparatus for enabling ID based streams are not so limited, as they may be implemented on or in association with any integrated circuit device, such as any input/output device or other computer component, as well as in conjunction with any type of serial point-to-point interconnect.

Serial Point-to-Point Layered Protocal Link/Interconnect

Figure 1:
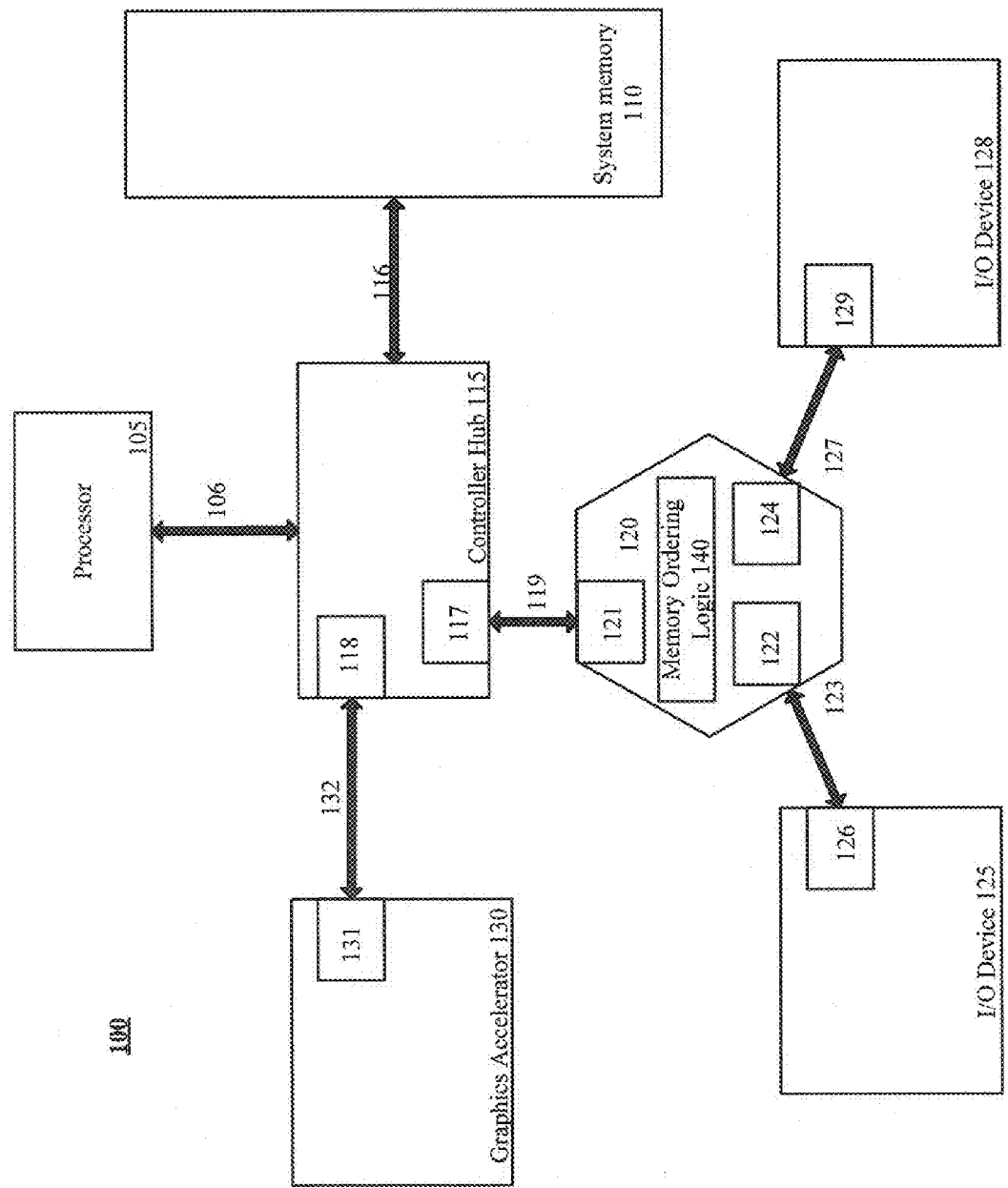
FIG. 1 illustrates an embodiment of a system including a serial point-to-point interconnect to connect I/O devices in a computer system.

Referring to FIG. 1, an embodiment of a system including devices coupled to a controller hub via a serial link is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH).

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. A module, such as modules 117, 118, 121, 122, 124, 126, 129 and 131, may be implemented in hardware, software, firmware, or any combination thereof. Furthermore, module boundaries commonly vary and functions are implemented together, as well as separately in different embodiments. In one embodiment, multiple devices are capable of being coupled to switch 120.

Switch 120 routes packets/messages from devices 125 and 128 upstream, i.e. up a hierarchy towards a root controller, to controller hub 115 and downstream, i.e. down a hierarchy away from a root controller, from processor 105 or system memory 110 to devices 125 and 128. Devices 125 and 128 include any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Switch 120 includes memory ordering logic 140, as described in more detail hereinafter, to enable device ID based streams.

Graphics accelerator 130 is also coupled to controller hub 115 through serial link 132. In one embodiment, graphics accelerator 130 is coupled to an MCH, which is coupled to an ICH. Switch 120, and accordingly I/O devices 125 and 128, is then coupled to the ICH. I/O modules 131 and 118 are also to implement a layered protocol stack to communicate between graphics accelerator 130 and controller hub 115.

Figure 2:
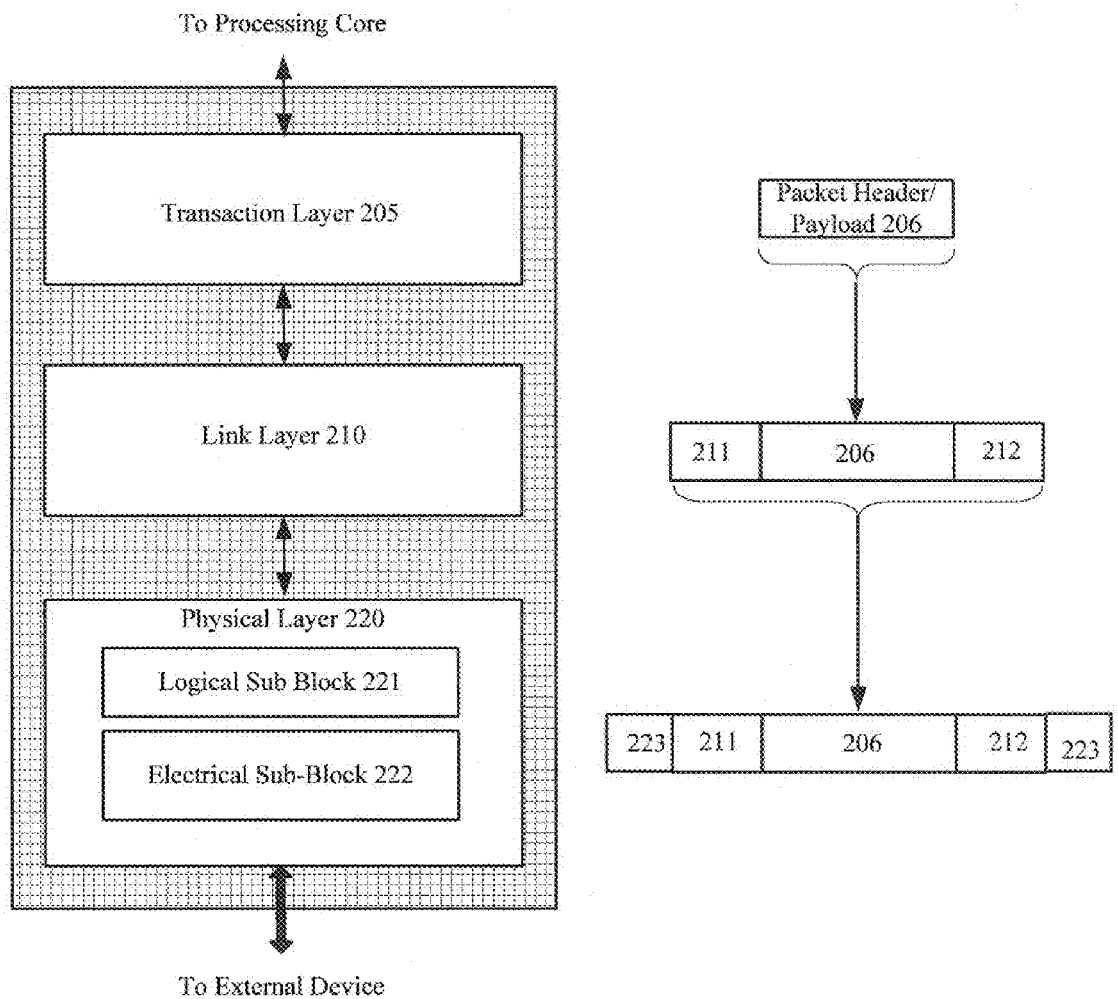
FIG. 2 illustrates an embodiment of a layered protocol stack.

Turning to FIG. 2 an embodiment of a layered protocol stack is illustrated. Layered protocol stack 200 includes any layered communication stack, such as a quick path interconnect (QPI) stack, PCIe stack, or other protocol stack. In one embodiment, protocol stack 200 is a PCIe protocol stack including transaction layer 205, link layer 210, and physical layer 220. An interface, such as interfaces 117, 118, 121, 122, 124, 126, 129 and 131 in FIG. 1, may be represented as communication protocol stack 200. Representation as a communication protocol stack is also referred to as a module or interface implementing/including a protocol stack.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for packet headers/payloads may be found in the PCIe specification, i.e. the PCIe base spec 2.0, which is available at http://www.pcisig.com/specifications/pciexpress/.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8 b/10 b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer.

Figure 3:
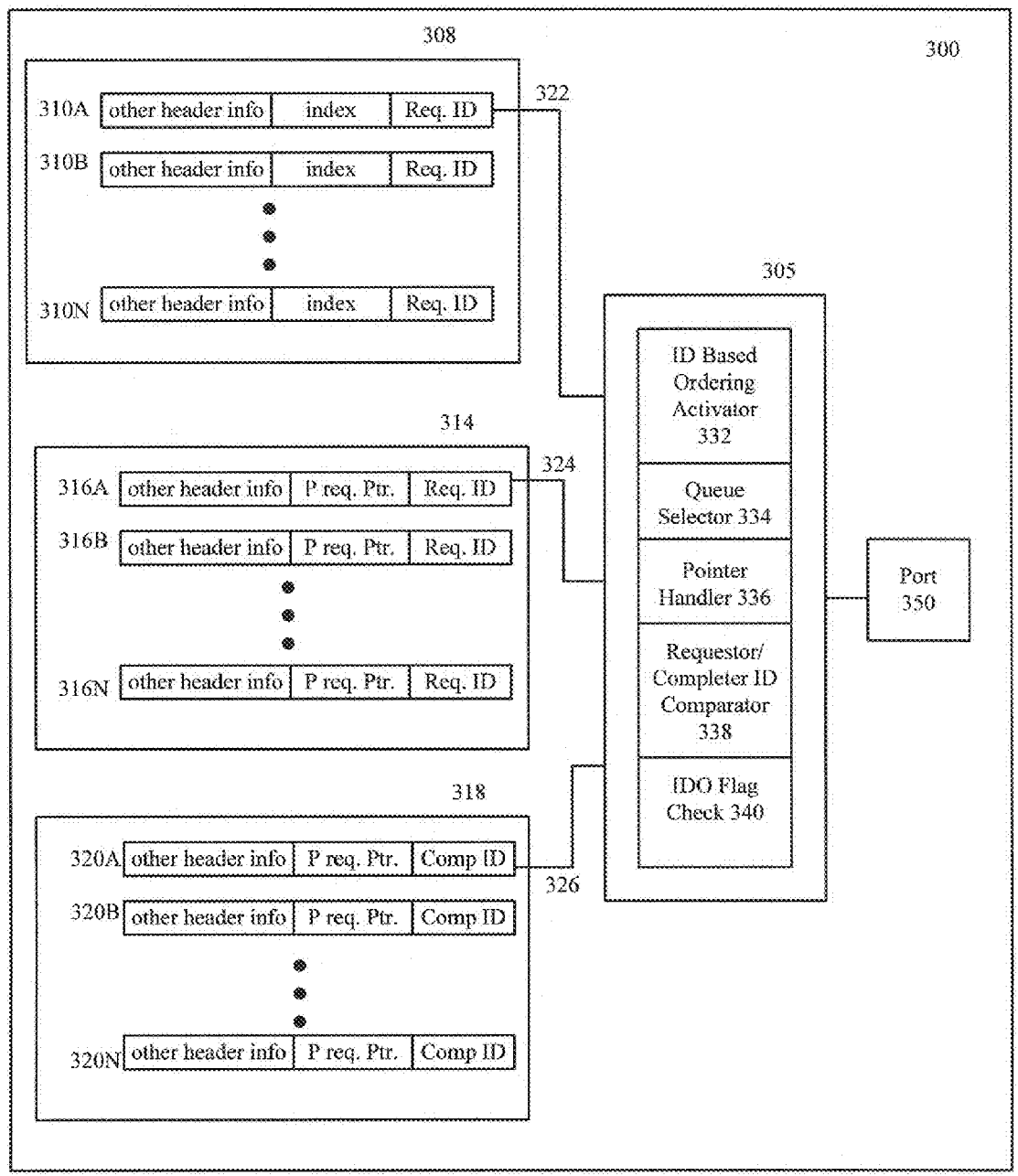
FIG. 3 illustrates an embodiment of a memory ordering logic.

Referring next to FIG. 3 an embodiment of a memory ordering logic is illustrated. As shown, intelligent switch 300 includes memory ordering logic 305, posted request queue 308 (including posted requests 310A-N) and pointer 322, non-posted request queue 314 (including non-posted requests 316A-N) and pointer 324, completion queue 318 (including completions 320A-N) and pointer 326, and port 350 (which may be an upstream or downstream port).

Figure 6:
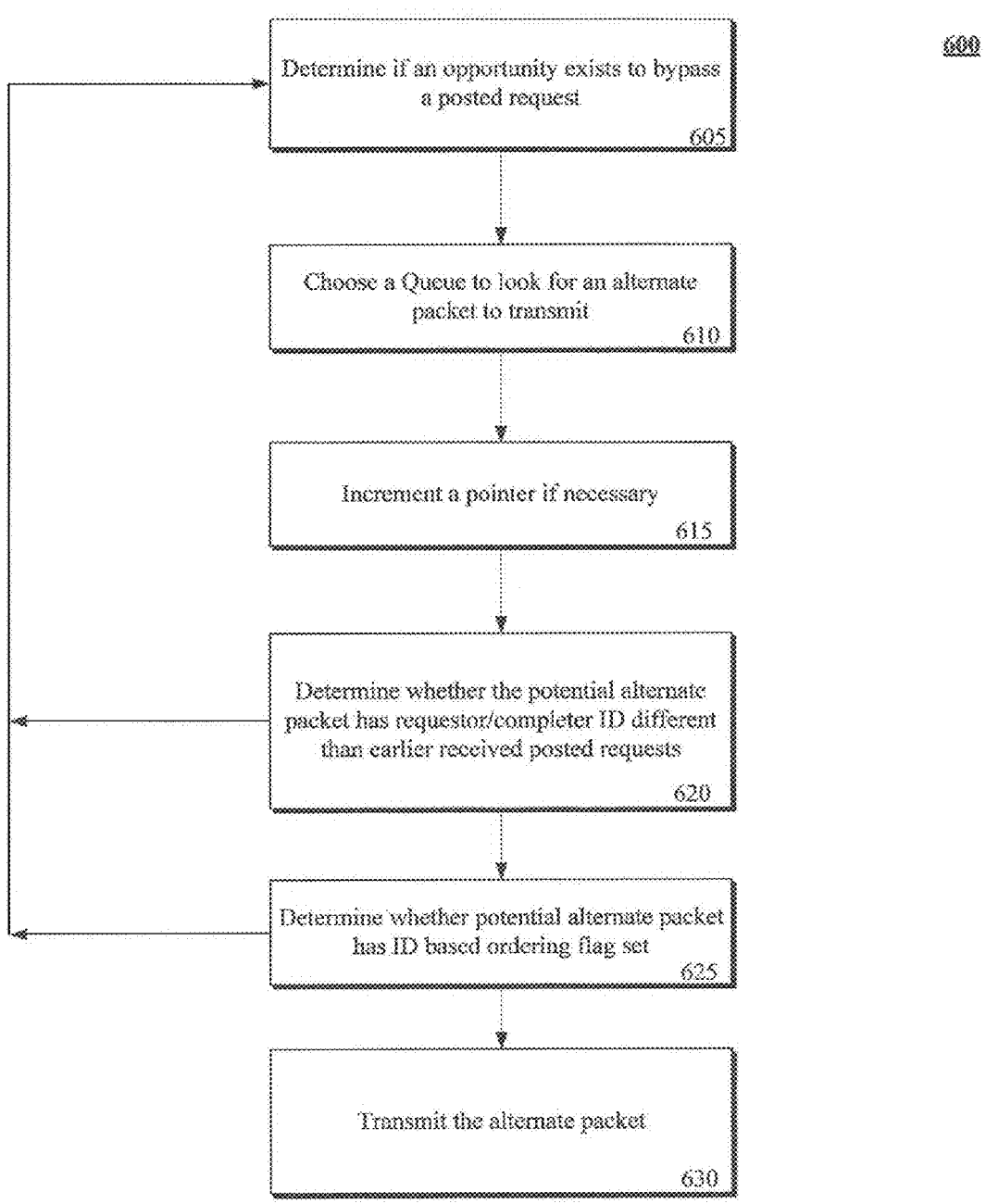
FIG. 6 illustrates an embodiment of a flow diagram for enabling device ID based streams.

Memory ordering logic 305 implements a method for enabling device ID based streams, for example as described in reference to FIG. 6, and may include ID based ordering activator 332, queue selector 334, pointer handler 336, requestor/completer ID comparator 338 and IDO flag check 340.

Figure 4:
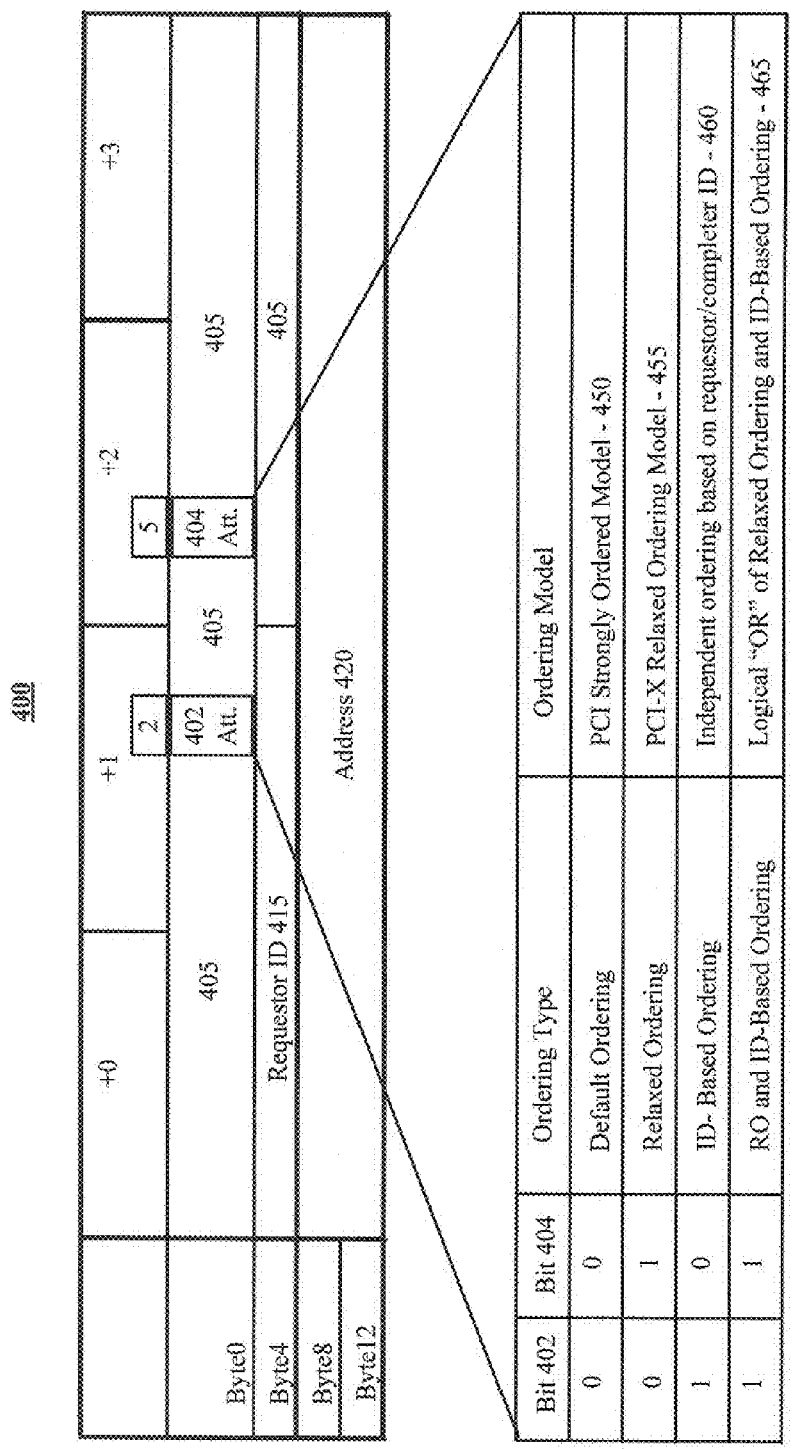
FIG. 4 illustrates an embodiment of a packet including an ID based ordering flag.

Referring to FIG. 4, an embodiment of a packet including an ID based ordering flag is illustrated. A packet refers to any request, message, access, or other grouping of information to be transmitted on a bus/interconnect. In the embodiment shown, packet 400 includes other information fields 405. Examples of other information 405 includes reserved fields, format fields, type fields, attribute fields, length fields, PCIe specific fields, and any other protocol specific fields. In addition, packet 400 includes requester ID 415 (bytes 4 and 5), which may reference a requesting agent/device and be part of a global ID/transaction descriptor or include a global ID/transaction ID, and address field 420 to reference an address location.

Attribute bits 402 and 404 may enable ordering models 450, 455, 460 and 465 as shown. Attribute bit 402, which may use currently reserved bit 2 of byte 1, represents an ID based ordering flag that may be set be a requestor or completer to indicate that a request or completion is order independent and may bypass posted requests.

Referring next to FIG. 5 an embodiment of an ordering table is illustrated. Table 500 is similar to Table 2-24 of the PCIe Specification, but is modified to allow bypassing of earlier queued, but stalled, posted memory write or message requests (col. 2) by an independent request stream in certain instances.

According to cell 505, a memory write or message request: with relaxed ordering attribute bit 404 clear and ID ordering bit 402 clear must not pass (a); with relaxed ordering attribute bit 404 set and ID ordering bit 402 clear is permitted to pass (b); and with relaxed ordering attribute bit 404 clear and ID ordering bit 402 set is permitted to pass any other memory write or message request if their requester ID's 415 are different(c).

According to cell 510 a read request: with relaxed ordering attribute bit 404 clear and ID ordering bit 402 clear must not pass (a); with relaxed ordering attribute bit 404 set and ID ordering bit 402 clear must not pass (b); and with relaxed ordering attribute bit 404 clear or set and ID ordering bit 402 set is permitted to pass any other memory write or message request if their requestor ID's 415 are different(c).

According to cell 515 I/O or configuration write requests cannot pass a memory write or message request. This preserves strong write ordering required to support producer/consumer usage model.

According to cell 520 a read completion: with relaxed ordering attribute bit 404 clear and ID ordering bit 402 clear must not pass (a); with relaxed ordering attribute bit 404 set and ID ordering bit 402 clear is permitted to pass (b); and with relaxed ordering attribute bit 404 clear and ID ordering bit 402 set is permitted to pass any other memory write or message request if its completer ID is different than the requester ID 415 of the memory write (c).

Finally, according to cell 525 I/O or configuration write completions are permitted to be blocked by or to pass memory write and message requests. Such transactions are actually moving in the opposite direction and, therefore, have no ordering relationship.

Referring next to FIG. 6 an embodiment of a flow diagram for enabling device ID based streams is illustrated. In flow 605, ID based ordering activator 332 determines if an opportunity exists to bypass a posted request. In one embodiment, activator 332 advances the process to flow 610 if it determines that a posted request is stalled.

Queue selector 334 then chooses a queue to look for an alternate packet to transmit in flow 610. In one embodiment, selector 334 chooses posted request queue 308, non-posted request queue 314 or completion queue 318 based on which queue has the most entries. In another embodiment, selector 334 always first chooses non-posted request queue 314 to look for an alternate packet. In flow 615, pointer handler 336 may increment one or more of pointers 322, 324, 326, for example, if a previous potential alternate packet was not permitted to pass (i.e., not from an independent stream or not having ID ordering bit 402 set).

Next, in flow 620 requestor/completer ID comparator 338 determines whether the requestor/completer ID of the potential alternate packet is different from any of the earlier received posted requests in posted request queue 308. In one embodiment, comparator 338 uses a posted request pointer stored with each non-posted request and completion to determine which posted requests in posted request queue 308 were received before the potential alternate packet. If the potential alternate packet is determined to be of an independent stream from earlier received posted requests, then the process continues with flow 625. Otherwise, the process returns to flow 605.

In flow 625, IDO flag check 340 verifies that ID ordering bit 402 is set in the potential alternate packet, and if so, in flow 630 the alternate packet is transmitted over port 350. Otherwise, the process returns to flow 605.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a port to transmit packets along a serial point-to-point link;
   a first queue to store packets of posted requests to be transmitted over the port;
   a second queue to store packets of non-posted requests to be transmitted over the port; and
   logic to selectively bypass a stalled posted request from the first queue and transmit over the port a non-posted request from the second queue that was received after the stalled posted request if a header of the non-posted request indicates the non-posted request is order independent and if the header of the non-posted request includes a requestor ID different from requestor IDs of earlier received posted requests in the first queue, further comprising a third queue to store packets of completions to be transmitted over the port, the logic to selectively bypass a stalled posted request from the first queue and transmit over the port a completion packet from the third queue that was received after the stalled posted request if a header of the completion packet indicates the stalled posted request is order independent and if the header of the completion packet includes a completer ID different from requestor IDs of earlier received posted requests in the first queue.

2. The apparatus of claim 1, wherein the port is an upstream port.

3. The apparatus of claim 1, further comprising a processor, a system memory, and a graphics accelerator communicatively coupled with the serial point-to-point link.

4. An apparatus comprising:
a port to transmit packets along a serial point-to-point link;
a first queue to store packets of posted requests to be transmitted over the port;
a second queue to store packets of non-posted requests to be transmitted over the port; and
logic to selectively bypass a stalled posted request from the first queue and transmit over the port a non-posted request from the second queue that was received after the stalled posted request if a header of the non-posted request indicates the non-posted request is order independent and if the header of the non-posted request includes a requestor ID different from requestor IDs of earlier received posted requests in the first queue, further comprising the logic to selectively bypass a stalled posted request from the first queue and transmit over the port a posted request from the first queue that was received after the stalled posted request if a header of the posted request indicates the stalled posted request is order independent and if the header of the posted request includes a requestor ID different from a requestor ID of the stalled posted request.

5. The apparatus of claim 4, wherein the port is an upstream port.

6. The apparatus of claim 4, further comprising a processor, a system memory, and a graphics accelerator communicatively coupled with the serial point-to-point link.

7. An apparatus comprising:
a port to transmit packets along a serial point-to-point link;
a first queue to store packets of posted requests to be transmitted over the port;
a second queue to store packets of non-posted requests to be transmitted over the port; and
logic to selectively bypass a stalled posted request from the first queue and transmit over the port a non-posted request from the second queue that was received after the stalled posted request if a header of the non-posted request indicates the non-posted request is order independent and if the header of the non-posted request includes a requestor ID different from requestor IDs of earlier received posted requests in the first queue, further comprising the second queue to store a posted request pointer associated with each non-posted request packet to indicate which posted requests stored in the first queue were received earlier than the each non-posted request packet.

8. The apparatus of claim 7, wherein the port is an upstream port.

9. The apparatus of claim 7, further comprising a processor, a system memory, and a graphics accelerator communicatively coupled with the serial point-to-point link.

* * * * *